United States Patent [19]

Banks

[11] 4,035,312
[45] July 12, 1977

[54] HEAT SHIELD COMPOSITION

[76] Inventor: Donald D. Banks, 812 Peterson St., Fort Collins, Colo. 80521

[21] Appl. No.: 687,259

[22] Filed: May 17, 1976

Related U.S. Application Data

[62] Division of Ser. No. 417,819, Nov. 21, 1973, Pat. No. 3,975,142.

[51] Int. Cl.² .................................. C09K 5/00
[52] U.S. Cl. .................................. 252/70
[58] Field of Search ............... 252/71, 73, 70, 62; 126/400; 106/74; 432/3, 4, 5, 10, 42, R, 65, 226, 245; 29/DIG. 24, DIG.48, 626; 148/13.1; 428/443, 920, 921

[56] References Cited

U.S. PATENT DOCUMENTS

| | | | |
|---|---|---|---|
| 1,887,618 | 11/1932 | Bell | 252/70 |
| 3,498,807 | 3/1970 | Gresham | 106/74 |

FOREIGN PATENT DOCUMENTS 1,035,811  7/1966  United Kingdom

*Primary Examiner*—Harris A. Pitlick
*Attorney, Agent, or Firm*—John E. Reilly

[57] ABSTRACT

A stable, heat-protective aqueous composition formed by admixing boric acid, asbestos and glycerol, with water added to provide the desired consistency, the composition being particularly suitable to absorb and disperse heat at elevated temperatures while not conducting heat through the composition and not forming objectionable deposits on a protected product.

6 Claims, 1 Drawing Figure

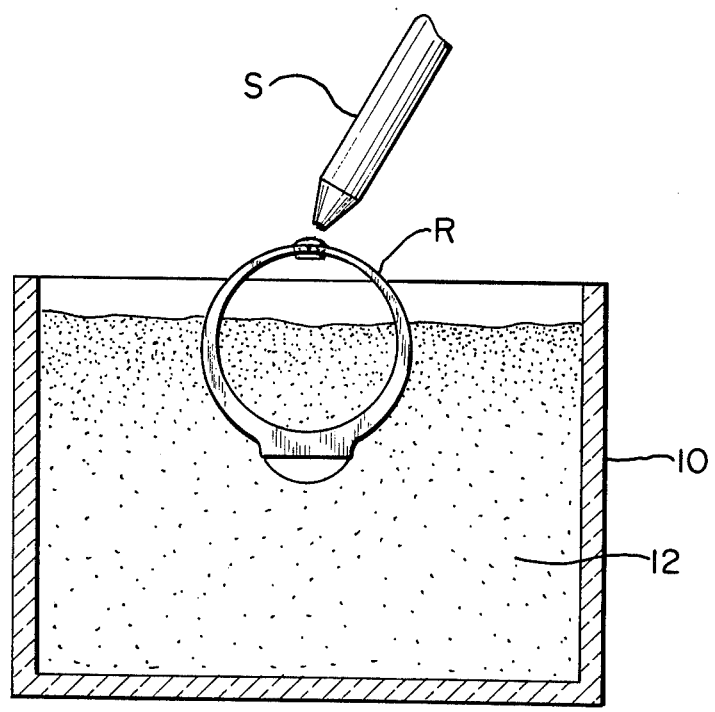

HEAT SHIELD COMPOSITION

This is a division of application Ser. No. 417,819, filed Nov. 21, 1973, now U.S. Pat. No. 3,975,142.

The present invention relates to compositions for protecting articles from heat, and more particularly, to a composition for absorbing and dispersing rather than transmitting heat energy which has particular utility as a coolant in the repair of articles, such as, jewelry, dental appliances, and the like.

The necessity of protecting materials from heat when, for instance utilizing heat to solder, flux, weld or otherwise treat one portion of an integral article having portions which are heat degradable are common and well known. In many instances, the problem is solved by placing a simple heat sink, i.e., a mass of metal or other material in between the heated portion of the article and the degradable portion of the article. The heat sink functions by absorbing the heat and its effectiveness is determined by its mass and specific heat. In general, heat sinks are suitable for relatively low temperatures and minimum quantity of heat. Protection of transistors when soldering the leads thereto onto circuit boards is a typical use.

Another more effective, but much more inconvenient, manner of dealing with heat flux is to immerse either an intermediate portion of the article, or the degradable portion of the article, in a liquid, and preferably, into water. Water not only has a relatively high specific heat, but, in extreme cases, rather large quantities of heat can be dissipated by vaporizing the water. The change of phase from liquid to vapor requires rather large amounts of heat and, accordingly, is a particularly effective means of absorbing and dispersing heat.

It will, of course, be recognized that it is not always convenient to maintain an article at least partially immersed in water. Thus, an ideal thermal-protective material would be a pliable paste which can be merely spread on the heat-decomposable portion of the article, or into which the portion of the article requiring protection could be pressed. Such a material would preferably be heat insulating on the whole though it would have a relatively high-heat conductance at the interface between the material and the article to which it is applied. In this manner, the heat would be drawn into the material but not transferred therethrough. The conditions would require that substantial amounts of heat be dissipated in a localized manner. A preferred mechanism for this would involve the decomposition of changes in state of a product with accompanying absorption of large quantities of heat energy. Unfortunately, many compositions upon decomposition form objectionable residue. Carbon deposits formed by organic compositions are a common example of this. Thus, a further requirement would be that the decomposition products be innocuous and, preferably, either an easily-removed powder or gaseous.

It is of course, relatively simple to accomplish any of the single above-mentioned purposes, but as is illustrated by prior art attempts of U.S. Pat. Nos. 403,707, 2,556,134, and 3,616,533, to concurrently accomplish the various requirements is not an easily accomplished task.

The present invention, which provides a heretofore unavailable improvement over previous compositions for protecting against heat energy, comprises a composition formed from the admixture of combination of components. Specifically, the composition is formed from a major portion of an asbestos powder admixed with minor portions of boric acid and glycerol. Water is added to provide the proper consistency. When applied to a surface, it effectively absorbs and dissipates heat flowing to such surface.

Accordingly, it is an object of the present invention to provide a new and improved composition which absorbs and dissipates substantial quantities of heat energy.

Another object of the present invention is to provide a new and improved composition which is heat stable and non-flammable, and is specifically adaptable for use in the treatment or repair of small articles, such as, jewelry, dental appliances and the like.

Yet another object of the present invention is to provide a new and improved composition which may be easily removed from the protected surface and leaves the surface substantially free of objectionable residue.

Still another object of the present invention is to provide a new and improved composition for protection against heat energy which composition is inert towards most substances, nontoxic and nonirritating.

These and other objects and features of the present invention will become more apparent from the following description when taken together with the accompanying drawing in which there is schematically shown the use of the composition in a soldering operation.

According to the instant invention, a superior heat-protective composition is formed by admixing asbestos powder, boric acid and glycerol. The admixture is preferably of about 100 parts by weight of asbestos powder, 5 parts by weight of boric acid and 0.75 parts to 1 part by weight of glycerol. Water is then added to provide a proper, paste-like consistency, though the composition is effective without particular regard to consistency. Thus, consistency can be provided with regard to convenience of use rather than operability with regard to thermal protection. For the preferred admixture, between 25 and 30 parts by weight of water provides a convenient consistency.

The optimum ratio between the asbestos powder and boric acid has been found to be 20 parts by weight of the asbestos powder to 1 part of boric acid, although this ratio may be varied within limits. It has been found that increasing amounts of boric acid with respect to the asbestos powder present will tend to cause crystallization and formation of deposits around the material being heated. However, reduction of the boric acid beneath the optimum ratio will tend to inhibit the fire retardant properties of the composition.

In turn, the glycerol acts as a binder and wetting agent and its advantage over other mineral oils is its solubility in water while not being affected by the heat In this relation, the coolant is most effectively used in temperature ranges of 1200°–1800° F. Nevertheless, it may be used at temperatures as high as 5000° F, although some decomposition of the coolant may be experienced at temperatures above 3500° F.

When used, the portion of the article to be protected is pressed or inserted into the composition. Alternatively, the composition is merely applied to a portion of the article which is to be protected, or at a position between the portion to be protected and the area to which heat is to be applied. When heat is applied to bring an unprotected portion of the article to an elevated temperature in the range of, for instance, 1000°

F. to 5000° F., the heat flux which flows towards the protected portion of the article is absorbed and dissipated by the composition.

An example of the use to which the composition can be advantageously put is to be found in the sizing of rings. Sizing of rings is accomplished by cutting the rear portion of the ring to the proper length and, in the instance of silver rings, soldering the ends of the ring together at a temperature of about 2500° F. As shown in the drawing, the composition 12 of the instant invention is disposed in a container 10, and is employed conveniently as a support with the portion of the ring R not being soldered pressed into the composition in order to minimize fire scale and to protect, for instance, gems or other portions of the ring. A torch or other soldering implement represented at S may then be brought into contact with the portion of the ring to be soldered in a conventional and well-known manner. It has been found that utilization of the composition of the instant invention does indeed minimize scaling of the ring and effectively protects heat-sensitive portions of the rings. After soldering is completed, the protective composition can be readily removed from the ring by rinsing with water. no objectionable residue and very minimal heat scaling results.

It will, of course, be recognized that the composition is useful for jewelry repairs in general as well as for such diverse purposes as dental repairs utilizing heat, soldering or electronic parts, protection of optical parts, and particularly for protection of heat-sensitive materials and explosives during shipment, storage or fabrication. The composition can be formed into molds to form ingots or other shapes from molten material.

Though the formulation of the composition has been described in terms of the ingredients employed therein, and it is believed that this is the most meaningful method of description, it is, of course, to be understood that the constituents may, in fact, interact. The unusual effectiveness of the composition suggests that a synergistic interaction exists between the ingredients, though the specific interaction, or mechanism, be it chemical or physical, has not been identified. Accordingly, when reference is made to the composition, though described in terms of the initial constituents, it is to be understood that the reference also includes the end product of the admixture which may differ chemically and/or physically from the original constituents.

Although one specific composition of the present invention has been described, it is anticipated that various changes and modifications will be apparent to those skilled in the art and, thus, such changes may be made without departing from the scope of the invention, as defined by the following claims.

What is claimed is:

1. A heat stable, inert composition for absorbing and dissipating heat flux, comprising the product formed by admixing about 100 parts by weight of asbestos, about 5 parts by weight of boric acid, between about 0.75 to 1 part by weight of glycerol, and between about 25 and 30 parts by weight of water, the product being of a consistency and nature particularly adapted to protect a portion of a heat-conductive article which is immersed in the composition from a heat flux applied to another, nonimmersed portion of the article.

2. The product as set forth in claim 1 wherein said asbestos is in the form of a powder.

3. The method of forming a heat stable, inert composition for absorbing and dissipating heat flux comprising admixing a major proportion of asbestos with minor proportions of boric acid and glycerol with water added to establish a paste-like consistency, the composition being of a consistency and nature particularly adapted to protect a portion of a heat-conductive article which is immersed in the composition from a heat flux applied to another non-immersed portion of the article.

4. The method of claim 3 wherein said asbestos is ground into a powder form prior to said admixing.

5. The method of claim 3 in which the asbestos is admixed in the amount of about 100 parts by weight of 5 parts by weight of boric acid and on the order of 1 part by weight of glycerol.

6. The method of claim 3 in which 25 to 30 parts by weight of water is added to provide the desired consistency.

* * * * *

UNITED STATES PATENT OFFICE
CERTIFICATE OF CORRECTION

Patent No. 4,035,312            Dated 12 July, 1977

Inventor(s) Donald D. Banks

It is certified that error appears in the above-identified patent and that said Letters Patent are hereby corrected as shown below:

Column 1, line 47, cancel "the" (2nd occurrence) and substitute -- these --.

Column 3, line 11, after "10" delete --, --.
           line 24, cancel "no" and substitute -- No --.

Claim 5, Column 4, line 37, cancel "of" (2nd occurrence) and substitute -- to --.

Signed and Sealed this

Eleventh Day of October 1977

[SEAL]

Attest:

RUTH C. MASON          LUTRELLE F. PARKER
*Attesting Officer*     *Acting Commissioner of Patents and Trademarks*